United States Patent
Mannava et al.

(10) Patent No.: US 11,055,250 B2
(45) Date of Patent: Jul. 6, 2021

(54) NON-FORWARDABLE TRANSFERS

(71) Applicant: Arm Limited, Cambridge (GB)

(72) Inventors: Phanindra Kumar Mannava, Austin, TX (US); Bruce James Mathewson, Papworth Everard (GB); Klas Magnus Bruce, Leander, TX (US); Damien Guillaume Pierre Payet, Antibes (FR); Jamshed Jalal, Austin, TX (US); Alex James Waugh, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/593,127

(22) Filed: Oct. 4, 2019

(65) Prior Publication Data

US 2021/0103543 A1    Apr. 8, 2021

(51) Int. Cl.
*G06F 13/40*      (2006.01)
*G06F 12/0815*    (2016.01)
*G06F 13/16*      (2006.01)

(52) U.S. Cl.
CPC ...... *G06F 13/4027* (2013.01); *G06F 12/0815* (2013.01); *G06F 13/1668* (2013.01); *G06F 2212/1041* (2013.01)

(58) Field of Classification Search
CPC ............. G06F 13/4027; G06F 13/1668; G06F 12/0815; G06F 2212/1041
See application file for complete search history.

(56) References Cited

U.S. PATENT DOCUMENTS

| | | | |
|---|---|---|---|
| 8,225,006 B1* | 7/2012 | Karamcheti | G06F 11/108 710/5 |
| 9,189,408 B1* | 11/2015 | Douglis | G06F 21/00 |
| 2005/0108662 A1* | 5/2005 | Morfey | G06F 30/347 438/15 |
| 2009/0210675 A1* | 8/2009 | Alexander | G06F 9/3836 712/216 |
| 2017/0286113 A1* | 10/2017 | Shanbhogue | G06F 9/30036 |
| 2018/0032435 A1* | 2/2018 | Parker | G06F 12/1009 |

OTHER PUBLICATIONS

Compute Express Link Specification, Revision 1.1, Jun. 2019, 250 pages.

* cited by examiner

*Primary Examiner* — Henry Tsai
*Assistant Examiner* — John B Roche
(74) *Attorney, Agent, or Firm* — Nixon & Vanderhye P.C.

(57) ABSTRACT

An apparatus to is provided, to be used with an interconnect comprising a home node. The apparatus includes general-purpose storage circuitry and specialised storage circuitry. Transfer circuitry performs a non-forwardable transfer of a data item from the general-purpose storage circuitry to the specialised storage circuitry. Transmit circuitry transmits an offer to the home node, at a time of the non-forwardable transfer, to transfer the data item to the home node. The apparatus is inhibited from forwarding the data item from the specialised storage circuitry to the home node.

19 Claims, 10 Drawing Sheets

FIG. 1

| Initial State | After offer issue | Intermediate Snoop | | Final state |
|---|---|---|---|---|
| | | SnpUnique*, SnpCleanInvalid, SnpMakeInvalid | | |
| | | SnpShared*, SnpNotSharedDirty*, SnpClean* | SnpOnce*, SnpCleanShared | |
| SC | SC | — | SC | SC | No Change |
| UC | Non-writeable UC | — | SC | UC | No Change if already I SC Otherwise |

SnpX* is equivalent to SnpX or SnpXFwd

| Data | V |
|---|---|
| - - - - - | 1 |
|  | 0 |
| - - - - - | 1 |
| - - - - - | 0 |
| - - - - - | 1 |
| - - - - - | 1 |
|  | 0 |
| - - - - - | 1 |

Unused = $\frac{3}{8}$ > 0 → determination = YES

NON-FORWARDABLE TRANSFERS

TECHNICAL FIELD

The present disclosure relates to data processing. More particularly, it relates to storage circuitry.

DESCRIPTION

In a data processing apparatus, certain data storage structures, such as caches, are provided in order to improve the speed at which data stored in the memory can be accessed. The data could be an instruction or could be another form of data such as a data value. Instruction caches are a special type of cache used to store instructions. Since instructions may generally be expected to not change, instruction caches can be built efficiently by not adding outgoing data paths towards the interconnect. However, this means that once an instruction is added to the instruction cache, if it is required again in the future it will be retrieved from the main memory, which is time consuming.

SUMMARY

Viewed from a first example configuration, there is provided an apparatus to be used with an interconnect comprising a home node, the apparatus comprising: general-purpose storage circuitry; specialised storage circuitry; transfer circuitry to perform a non-forwardable transfer of a data item from the general-purpose storage circuitry to the specialised storage circuitry; and transmit circuitry to transmit an offer to the home node, at a time of the non-forwardable transfer, to transfer the data item to the home node, wherein the apparatus is inhibited from forwarding the data item from the specialised storage circuitry to the home node.

Viewed from a second example configuration there is provided a method of transferring data in an interconnect comprising a requester node and a home node, the method comprising: performing a non-forwardable transfer of a data item from general-purpose storage circuitry in the requester node to specialised storage circuitry in the requester node; and transmitting an offer to the home node, at a time of the non-forwardable transfer, to transfer the data item to the home node, wherein the requester node is inhibited from forwarding the data item from the specialised storage circuitry to the home node.

Viewed from a third example configuration, there is provided an apparatus to be used with an interconnect comprising a requester node, the apparatus comprising: general-purpose storage circuitry; processing circuitry to perform a determination of whether a data item is to be stored in the general-purpose storage circuitry; and receive circuitry to receive an offer from the requester node, at a time of a non-forwardable transfer by the requester node, to transfer the data item to the apparatus prior to the data item being made non-forwardable, wherein the processing circuitry is adapted to respond to the offer based on the determination.

Viewed from a fourth example configuration, there is provided a method of transferring data in an interconnect comprising a requester node and a home node, the method comprising: receiving an offer from the requester node, at a time of a non-forwardable transfer by the requester node, to transfer the data item to the home node prior to the data item being made non-forwardable; performing a determination, at the home node, of whether the data item is to be stored in the general-purpose storage circuitry of the home node; and responding to the offer based on the determination.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one aspect there is provided an apparatus to be used with an interconnect comprising a home node, the apparatus comprising: general-purpose storage circuitry; specialised storage circuitry; transfer circuitry to perform a non-forwardable transfer of a data item from the general-purpose storage circuitry to the specialised storage circuitry; and transmit circuitry to transmit an offer to the home node, at a time of the non-forwardable transfer, to transfer the data item to the home node, wherein the apparatus is inhibited from forwarding the data item from the specialised storage circuitry to the home node.

In the above aspect, the apparatus is adapted to be used in an interconnect, with the interconnect having a home node. Such a home node may be used for providing data coherency within a network of devices (including the apparatus). The apparatus includes general-purpose storage circuitry and specialised storage circuitry. The two storage circuitries are such that although the apparatus can provide data stored in the general-purpose storage circuitry to the home node and/or interconnect, it is unable to provide data that is stored in the specialised storage circuitry to the home node and/or interconnect. This might be due to, for instance, a lack of outgoing data path with which data can be output from the specialised storage circuitry to the home node and/or interconnect. When data is to be transferred from the general-purpose storage circuitry to the specialised storage circuitry, an offer for the data is transmitted to the home node. In this way, the home node is given the opportunity to keep a copy of the data before it is made inaccessible. Hence, once the non-forwardable transfer occurs, the data can still be accessed by the home node. In some examples, the offer may include a recommendation of the apparatus as to whether the data items should be accepted by the home node. Such a recommendation may be overridden by the home node, which may have a greater view of the network and whether the data items should be accepted or not. Note that a non-forwardable transfer does not necessitate the actual movement of data. Instead, the term refers to the nature of the data becoming non-forwardable. For instance, a non-forwardable transfer is said to occur in a situation in which the same data exists in both the specialised storage circuitry and the general-purpose storage circuitry and the data is deleted from the general-purpose storage circuitry. In this case, the data becomes non-forwardable and is said to have been subject to a non-forwardable transfer even though the data has not actually been moved (or as been deleted). The transfer is therefore a transfer of state (from forwardable to non-forwardable).

In some examples, the general-purpose storage circuitry is adapted to store clean data and dirty data; and the specialised storage circuitry is adapted to store clean data and is prohibited from storing dirty data. Clean data can be considered to be data that has not been changed as compared to the version of the data that is stored in main memory. In contrast, dirty data can be considered to be data that has changed since having been retrieved from main memory and therefore differs from the version of the data stored in main memory. The specialised storage circuitry, in these examples, is unable to store dirty (e.g. changed) data. The data stored in the specialised storage circuitry may be read-only, for instance. This may be the case where the data is not to be changed or is unlikely to be changed, as may be the case in an instruction cache, for example.

In some examples, the data item is clean. In these examples, the data item cannot be dirty since in such situations, the data item would have to be written back to memory. This is because, having transferred the data to the specialised storage circuitry, if the data item was dirty then there would be no mechanism for that data to be saved back to the memory. Consequently, modifications made to the data would be lost.

In some examples, the general-purpose storage circuitry is a data cache; and the specialised storage circuitry is an instruction cache. A data cache may be used for storing both data and instructions. In contrast, an instruction cache is typically used for storing instructions rather than other forms of data. Typically, an instruction cache is such that its logic footprint and access latency are reduced. This can be achieved by removing certain data paths, including the ability to write back to memory. Since it may be expected that instructions rarely (if ever) change, the need to write instructions back to main memory from the instruction cache is limited. It may, however, be the case that instructions are transferred from a data cache to an instruction cache. Such a situation could arise in the case of Just-In-Time (JIT) compilation where data in the form of byte code is stored within a data cache and then compiled into an instruction. Once the data has been compiled into an instruction, the instruction is passed into the instruction cache for execution.

In some examples the apparatus comprises: snoop response circuitry to respond to a snoop response by transmitting data stored in the general-purpose storage circuitry, wherein the snoop response circuitry is inhibited from responding to the snoop response by transmitting data stored in the specialised storage circuitry. Snooping is a technique in which data held in one cache is accessed for the benefit of another cache. For instance, in a situation in which two CPUs each have their own cache, a data value held in one of the caches belonging to a first of the two CPUs may be obtained from the first cache by the second cache belonging to the second CPU. This saves the necessity of the data value being written back from the first cache into main memory and then retrieved from main memory for the second cache. Such a process may incur a large latency due to the latencies associated with accessing main memory. By using snooping, a centralised coherency manager (such as a home node) attempts to keep track of the data stored by each different cache. Accordingly, when a request for data is received, the home node consults a snoop filter to determine whether that data is currently stored in another cache. This is then confirmed with one or more snoop requests, which control the state and the location of the data so that the request can be fulfilled. In some cases, this may involve the data being moved. In some other cases, this may involve the data being copied. Such processes will depend on the nature of how the data is used by the different caches such as whether the data is already shared or exclusively owned and whether the data is read-only. In these examples, it may not be possible for snoop responses to be issued in respect of data that is stored in the specialised storage circuitry. In particular, this may be due to the lack of outgoing data path from the specialised storage circuitry to the home node/interconnect. Such a lack of data path may be produced in order to help improve the simplicity and the latency of the specialised storage circuitry.

In some examples the transmit circuitry is adapted to transfer the data item to the home node in response to receiving an acceptance of the offer. In such examples, when the home node responds to the offer by accepting the offer, the transmit circuitry transfers the offered data item to the home node. Such a transfer is carried out in addition to the data being transferred from the general-purpose storage circuitry to the specialised storage circuitry.

In some examples the apparatus comprises: receive circuitry to receive the acceptance of the offer. The receive circuitry may also be adapted to receive a refusal of the offer that is made by the home node in a situation in which the home node does not desire the data.

In some examples, the offer comprises the data item. In these situations, the offer for the data comprises the data itself. Consequently, in such situations, the home node need not respond to the offer for the data by requesting the data. Instead, the data is pre-emptively sent (as part of the offer) and if the home node desires the data, the data can be immediately stored. If, however the home node does not desire the data, the data can simply be discarded. This forgoes need for an exchange of messages to occur between the apparatus and the home node. However, it will be appreciated that the offer for the data will be larger due to the data being pre-emptively transmitted even though it may not be desired. Consequently, the bandwidth consumed by the interconnect may be greater.

In some examples, the apparatus comprises: a requester node, wherein the requester node comprises the general-purpose storage circuitry, the specialised storage circuitry, the transfer circuitry, and the transmit circuitry. Such an apparatus could, for instance, take the form of a CPU containing the requester node in the form of a cache. In such a situation, the cache may include the general purpose storage circuitry and the specialised storage circuitry. In addition, the transfer circuitry and the transmit circuitry may also form part of the cache/requester node. An example of such a cache may be a level 1 cache which may comprise a data cache (which could be an example of general-purpose storage circuitry) and an instruction cache (which could be an example of specialised storage circuitry).

In accordance with another aspect, there is provided an apparatus to be used with an interconnect comprising a requester node, the apparatus comprising: general-purpose storage circuitry; processing circuitry to perform a determination of whether a data item is to be stored in the general-purpose storage circuitry; and receive circuitry to receive an offer from the requester node, at a time of a non-forwardable transfer by the requester node, to transfer the data item to the apparatus prior to the data item being made non-forwardable, wherein the processing circuitry is adapted to respond to the offer based on the determination.

In the above aspect, the apparatus is adapted to be used in an interconnect, with the interconnect having a requester node. Such a requester node could be a CPU or could form part of a CPU. The apparatus includes general-purpose storage circuitry, which could take the form of a cache. Processing circuitry makes a determination as to whether a particular data item is to be stored in the general-purpose storage circuitry. This determination may be based on a number of criteria as will be explained below. Receive circuitry is used to receive an offer from the requester node for data to be transferred from the requester node to the apparatus. Such an offer occurs at a time of a non-forwardable transfer by the requester node. In other words, the offer to transfer the data is associated with an indication that the data that is being offered will soon become inaccessible from the requester node. Having received such a request, the determination circuitry is used to make a determination (e.g. using the criteria) as to whether the data should be stored in the general-purpose storage circuitry of the apparatus. Depending on the result of the determination, a response is made by the processing circuitry. In this way, the apparatus can decide whether to acquire data that is due to otherwise become inaccessible via the requester node. Since such data would otherwise be accessed via a main memory, which may be slow, the apparatus is able to make a decision as to whether there is any value to be had in acquiring the data so that it can be accessed quickly, or whether the data should not be transferred, in which case, if it is required by a node other than the requester node, it may be necessary to access that data via main memory.

In some examples, the apparatus comprises: transmit circuitry to transmit a request for the data item, wherein in response to the determination being that the data item is to be stored in the general-purpose storage circuitry, the processing circuitry is adapted to cause the transmit circuitry to transmit the request. In such examples, the transmit circuitry is used to transmit a request for the data item that was the subject of the offer when the determination is that the data item is to be stored in the general-purpose storage circuitry. The request is transmitted to the requester node via, e.g. the interconnect and the requester node responds by providing the data item.

In some examples, in response to the determination being that the data item is not to be stored in the general-purpose storage circuitry, the processing circuitry is adapted to not transmit the request. If it is determined that the data item is not to be stored in the general-purpose storage circuitry (e.g. if it is determined that it is undesirable for the data item to be stored in the general-purpose storage circuitry), then the request for the data item is inhibited from being transmitted. In such embodiments, lacking any explicit request for the data, the requester node will not transmit the data item at the time of the non-forwardable transfer occurring.

In some examples, the offer from the requester node comprises the data item; in response to the determination being that the data item is to be stored in the general purpose storage circuitry, the processing circuitry causes the data item to be stored in the general-purpose storage circuitry; and in response to the determination being that the data item is not to be stored in the general-purpose storage circuitry, the processing circuitry causes the data item to be discarded. In such examples, the offer from the requester node comprises the data item itself. If the determination is that the data item is to be stored, the processing circuitry causes the data item to be stored in the general-purpose storage circuitry. Otherwise, the data item provided as part of the request is discarded. In this way, it is not necessary for requests to be sent back and forth between the apparatus and the requester node. Instead, the data item is pre-emptively provided as part of the offer. The data item can then be stored or not based on a result of a determination. This can be used to improve latency since the exchange of messages between the apparatus and the requester node can be reduced. However, this may come at a cost of bandwidth, since the data item is pre-emptively transmitted each time, regardless of whether it is actually desired by the apparatus. Each such transmission therefore utilises the bandwidth of the interconnect.

In some examples, the apparatus comprises: performance analysis circuitry to analyse a hit rate of the general-purpose storage circuitry, wherein during a first period of time, the determination is that the data item is to be stored; during a second period of time, distinct from the first period of time, the determination is that the data item is not to be stored; and during a third period of time after the first period of time and second period of time, the determination is based on the hit rate of the general-purpose storage circuitry during the first period of time compared to the hit rate of the general-purpose storage circuitry during the second period of time. The performance analysis circuitry can be used to analyse a hit rate of the general-purpose storage circuitry in respect of requests that are received by the apparatus for data. The hit rate could, for instance, be a percentage of requests that hit in the general-purpose storage circuitry, or could be a count of the number of requests that hit in the general-purpose storage circuitry. The hit rate could also be measured as a failure to hit rate (e.g. a miss rate)—which again could be represented by either a percentage or a count. Regardless of how the hit rate is measured, there is a first period of time in which the hit rate of the general-purpose storage circuitry is tested while the determination for each data item is that the data item should be stored. There is also a second period of time used to test the hit rate in which the hit rate is measured when the determination is that each data item is not to be stored. The first period of time and the second period of time are distinct (e.g. not overlapping) such that these two periods of time may be used to perform A/B testing. The first period of time and the second period of time may be equal. This could be measured as a chronological time (e.g. measured in seconds) or could be event based (e.g. measured according to a number of requests received or a number of offers made). The first and second periods of time can also occur in either order. In any event, there is a third period of time that occurs after the first period time and after the second period of time. During this third period of time, the determination is based on the hit rate of the general-purpose storage circuitry during the first period of time as compared to the hit rate of the general-purpose storage circuitry during the second period of time. For instance the determination may match the determination that was in use for whichever of the first period of time and the second period of time lead to the greater hit rate. In this way, the performance analysis circuitry attempts both possibilities for the determination, and depending on which of the two possibilities lead to the greater hit rate, that determination is used for the third period of time. It will be appreciated that, in some embodiments, the three periods of time may be performed repeatedly so that the determination is able to adapt. Such a technique represents one of the criteria that can be used in order to make a determination of whether a data item should be stored in a general-purpose storage circuitry or not.

In some examples, the interconnect comprises a second requester node; each of the requester node and the second requester node comprise an instruction cache; and the determination is based on a similarity between: instructions in the instruction cache of the requester node, and instructions in the instruction cache of the second requester node. The similarity between instructions in the instruction cache of the requester node and the instructions in the instruction cache of the second requester node could be calculated by looking at a proportion of instructions in one or both caches that occur in both caches. For instance, if each instruction cache has a capacity of 32 entries, and 16 of those entries are identical, then it may be concluded that the similarity is 50 percent (16/32). A similarity of instructions between the two instruction caches that is over a threshold value suggests a significant re-use of instructions between requester nodes. Consequently, it is likely that an offer for data that is to be moved to an instruction cache is likely to be relevant to multiple requester nodes and so there may be value in retaining that data, since it is more likely to be used or required by one of the requestor nodes in the future. Such a technique represents one of the criteria that can be used in order to make a determination of whether a data item should be stored in a general-purpose storage circuitry or not.

In some examples, the determination is based on an unused capacity of the general-purpose storage circuitry. In such examples, it may be appropriate for the offer of data to be accepted if the general-purpose storage circuitry has an unused capacity or has an unused capacity of a certain amount. Unused capacity could be considered to be entries of the general-purpose storage circuitry that are empty or marked as invalid. In some examples, the determination may be based on whether a slot or the general-purpose storage circuitry into which the data would be stored is currently unused. In either situation, it may be more appropriate to store data where there is unused capacity. This is because otherwise the capability of the general-purpose storage circuitry is being limited. Such a technique represents one of the criteria that can be used in order to make a determination of whether a data item should be stored in a general-purpose storage circuitry or not.

In some examples, the determination is based on a time-last-used of an existing entry of the general-purpose storage circuitry at which the data item would be stored. Each entry of the general-purpose storage circuitry may provide an indication of when that entry was last used. In such examples, if the time at which an entry into which the offered data would be stored has a time-last-used that exceeds a threshold value (e.g. if it was accessed more than a threshold value ago), then this suggests that the data currently stored in that slot of the general-purpose storage circuitry is unlikely to be used again. Consequently, it may be considered to be appropriate for the data being offered to be stored in place of the data that is currently stored in that slot. Such a technique represents one of the criteria that can be used in order to make a determination of whether a data item should be stored in a general-purpose storage circuitry or not.

In some examples, the apparatus comprises: a home node, wherein the home node comprises the general-purpose storage circuitry, the processing circuitry, and the receive circuitry. The apparatus could therefore be or include the home node that is responsible for co-ordination coherency of data within the interconnect. In some examples, the apparatus is the interconnect itself, which may comprise the home node. The general-purpose storage circuitry could be, for instance a system cache associated with the home node. Note that a home node may include a snoop filter that attempts to track a location of data held by different caches connected to the interconnect. In such a situation, in response to receiving the offer relating to the non-forwardable transfer, the snoop filter is updated to reflect the new location of the data (regardless of whether the offer is accepted or not). This information may be implicit by the nature of the offer or may be indicated explicitly in the offer itself.

In some examples, the transmit circuitry is adapted to inhibit transmitting the offer to the home node in response to a number of previous offers being declined by the home node. The apparatus can, in these examples, track a number of offers made to the home node that are accepted. If and when the acceptance rate drops below a given threshold, the apparatus can take a corrective action such as inhibiting the transfer of future offers. Such a corrective action could be carried out for an individual home node or a group of home nodes and could be permanent or temporary (e.g. based on a period of time or a number of non-forwardable transfers, or some other measure). The acceptance can be monitored via the subsequent request (or refusal) of the offered data. By inhibiting the transmission of future offers, it is possible to save bandwidth as a result of offering data that is statistically likely to be rejected by the home node.

Particular embodiments will now be described with reference to the figures.

Figure 1:
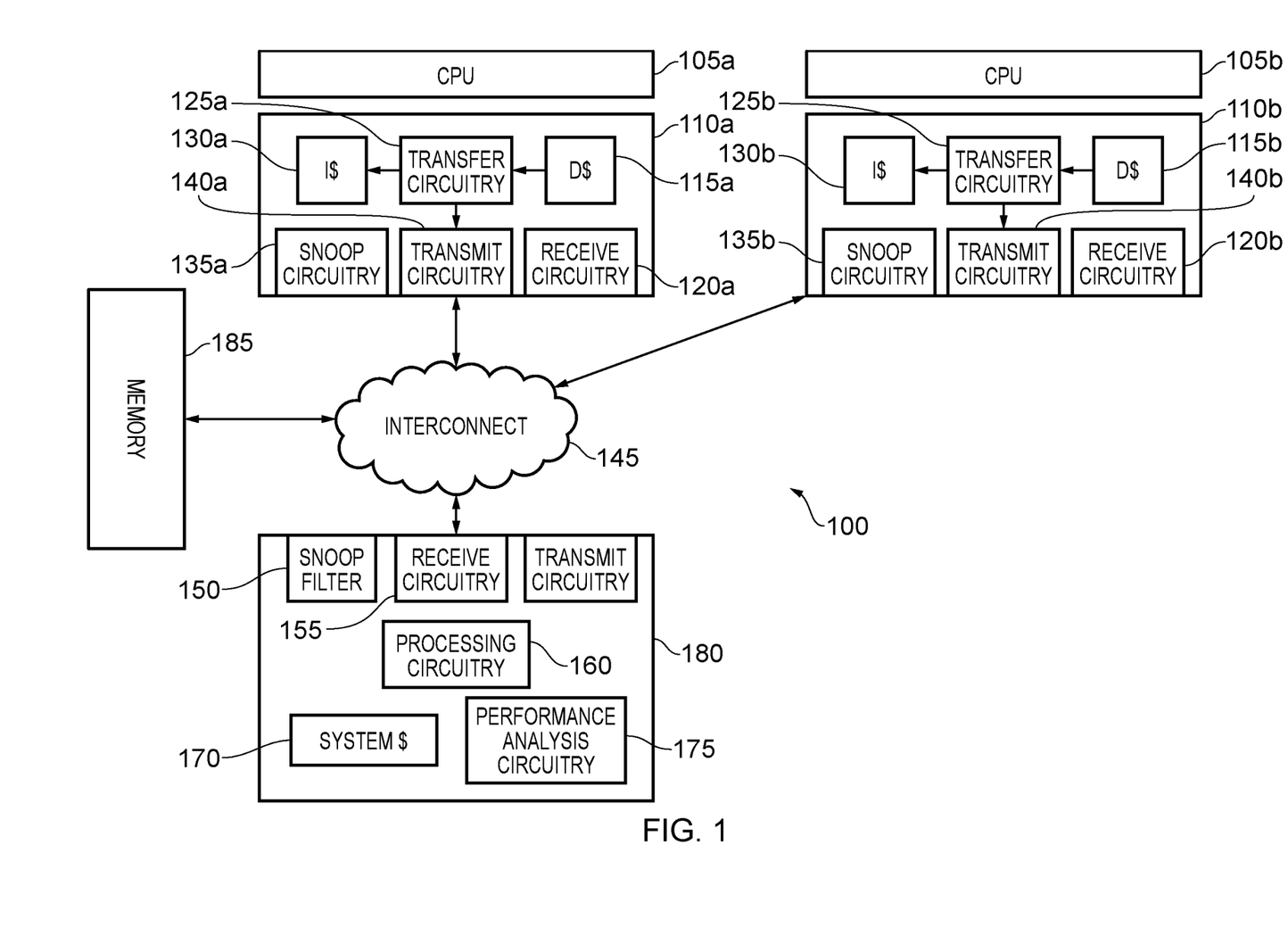
FIG. 1 illustrates a system containing a first requester node, a second requester node, and a home node, which is accessed via an interconnect in accordance with some embodiments.

FIG. 1 illustrates a system 100 containing a first requester node 110*a*, a second requester node 110*b*, and a home node 180, which is accessed via an interconnect 145. The first requester node 110*a* is associated with a first CPU 105*a* and the second requester node 110*b* is associated with a second CPU 105*b*. Each of the first requester node 110*a* and second requester node 110*b* contains a data cache 115*a*/115*b*. During operation, transfer circuitry 125*a*/125*b* transfers an entry from the corresponding data cache 115*a*/115*b* to a corresponding instruction cache 130*a*/130*b*. This might occur in a situation involving Just-In-Time (JIT) compilation where byte code is compiled into an instruction, which is then moved into the instruction cache 130*a*/130*b*. It is, however, common for an instruction cache 130*a*/130*b* to lack a data path for data to be output to the interconnect 145 and thereby the home node 180. This may be the case so as to simplify the operation of the instruction cache 130*a*/130*b* and thereby reduce its latency in providing instructions to the CPU 105*a*/105*b*. In these embodiments, therefore, the transfer circuitry 125*a*/125*b* uses the transmit circuitry 140*a*/140*b* in order to transmit an offer to the home node 180 via the interconnect 145. The offer is made in respect of the data that is being non-forwardably transferred from the data cache 115a/115b to the instruction cache 130a/130b. Note that another situation in which a non-forwardable transfer might occur is if the data (e.g. instruction) already exists in both the data cache 115a/115b and the instruction cache 130a/130b. In such a situation, the CPU 105a/105b might make the decision, to improve capacity usage, to delete the copy from the data cache 115a/115b, thereby rendering the remaining copy of the instruction in the non-forwardable instruction cache 130a/130b.

The home node 180 makes a decision using its processing circuitry 160 in order to determine whether the data in question is desired. If so, then the data is stored in a system cache 170 of the home node 180.

There are a number of ways in which the data can be transferred to the home node 180. In some embodiments, the transfer takes place using transmit circuitry 140a/140b to transmit the offer, and receive circuitry 120a/120b to receive a response made to the offer. Similarly, receive circuitry 155 may be employed by the home node 180 in order to receive the offer, and transmit circuitry may be employed in order to transmit a response to the offer to the requester node 110a/110b. The receive circuitry 155 may also be responsible for receiving the data from the requester node 110a/110b. In this way, the home node 180, which is responsible for co-ordinating coherency of data throughout the system 100 and which in a position to maintain a global view of the system 100, is able to make a decision. There are a number of different ways in which this decision can be made and such techniques are explored with reference to FIGS. 5 to 8.

The home node 180 also contains a snoop filter 150. The snoop filter 150 makes it possible to track the location of data within the system 100. Consequently, if a first requester node 110b requests data that is stored at another requester node 110a, then this fact may be available to the snoop filter 150. Accordingly, the home node 180 can issue a snoop request to the other requester node 110a in order to determine the presence of the data and to obtain the data if necessary. This can then be passed (directly or indirectly) to the requester node 110b that requested the data. This process is much faster than having to write the data back from the other requester node 110a to a memory 185 and then obtaining the data from the memory 185 and providing it back to the requester node 110b. In particular, the latency of memory 185 makes this process particularly slow. Note that the lack of outgoing data path from the instruction cache 130a/130b to the interconnect 145 means that the snoop circuitry 135A/135B cannot respond to a snoop request if the requested data is stored within the instruction cache 130a/130b. The snoop filter is updated to indicate the new location of the offered data, regardless of whether the offer is accepted by the home node 180 or not. For instance, if the data is not accepted, the snoop filter may have its entry for that data removed (since the data can no longer be accessed). If the data is accepted then the snoop filter may have its entry updated to indicate that the data is stored in the system cache 170.

The system 100 of FIG. 1 also illustrates performance analysis circuitry 175 which forms part of the home node 180. The performance analysis circuitry 175 can be used by the processing circuitry 160 in order to help answer the determination of whether particular data should be stored in the system cache 170 when it is offered by a requester node 110a/110b. Such a process will be illustrated in more detail with respect to FIG. 5.

The performance analysis circuitry, in some embodiments, also tracks a number of offers of data that are accepted/rejected by the home node 180. If the acceptance rate drops below a given threshold then the requester node 110a/110b can take corrective action. For instance, the requester node 110a/110b could refuse to send further offers to the home node 180, or could send offers to a different home node. Such a corrective action could be permanent, or could occur for a period of time. Tracking of such rejection can be done per home or per group of homes or across all home.

Figure 2:
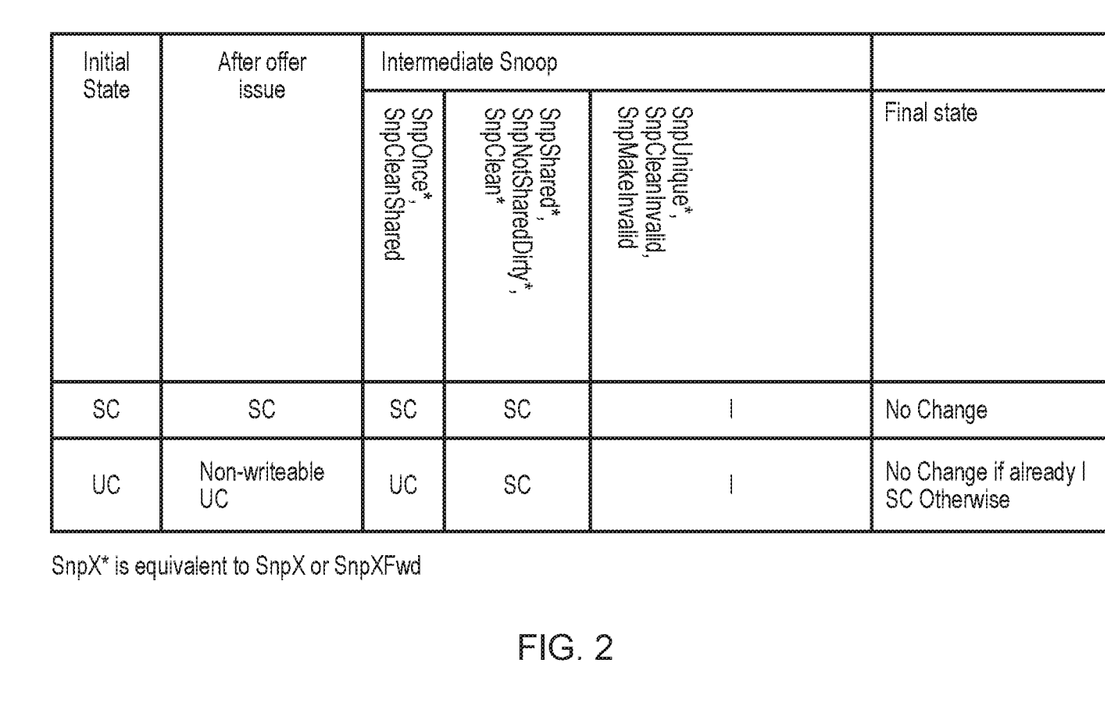
FIG. 2 illustrates state transitions in respect of data that is stored at the requester node during the offering process in accordance with some embodiments.

FIG. 2 illustrates state transitions in respect of data that is stored at the requester node 110a/110b during the offering process. In particular, the initial state of the data is one of either shared clean (SC) in which the data is unmodified and is shared between multiple devices, or unique clean (UC) in which the data is not shared and not modified. Immediately after making the offer, if the data was previous UC, it becomes non-writeable UC so that the data cannot be modified. After the offer has been made, one or more snoop requests may be issued. In the case of SnpOnce* (a snoop to obtain a current copy) and SnpCleanShared (a snoop to clean the cache), the state of the data entry either remains as SC (if it was already SC) or becomes UC (if the state was already a non-writeable UC). In the case of SnpShared*, SnpNotSharedDirty*, and SnpClean* (variants of snoops to share a copy of the data), the entry becomes SC. In the case of SnpUnique* (a snoop to invalidate remote copies to enable a store to memory to occur), SnpCleanInvalid (a snoop to invalidate a cache line), and SnpMakeInvalid (another snoop to invalidate a cache line), the entry becomes Invalid (I). The final state of the data, once any transfer has occurred, remains the same if the data was originally SC. If the data was originally UC, then the state of the data remains as I if it is already I. Otherwise, the data becomes SC. Note that the presence of a * in the snoop message (e.g. SnpClean*) means that the name encompasses both the snoop message and a forwarded version of that snoop message (e.g. a snoop that tells the recipient of the snoop, if it can, to forward the data directly to the requesting master).

Figure 3A:
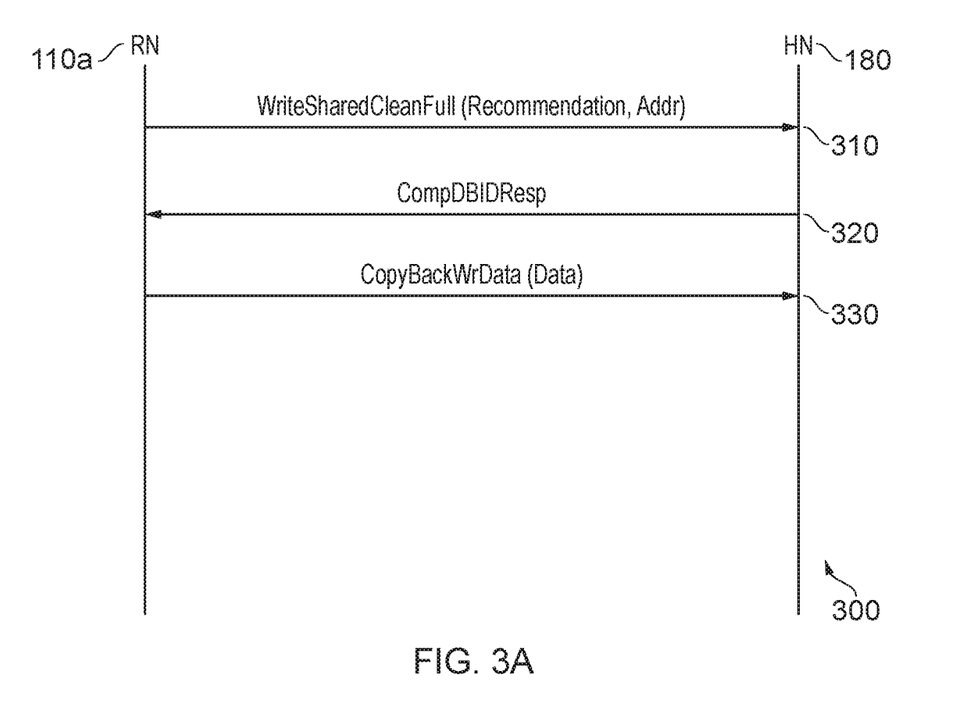
FIG. 3A shows an exchange of messages between a requester node and a home node when making an offer for data in accordance with some embodiments and FIG. 3B illustrates an exchange of messages when the home node determines that the data is not to be stored in accordance with some embodiments.

FIG. 3A shows an exchange 300 of messages between a requester node 110a and a home node 180 when making an offer for data. At a step 310, a WriteSharedCleanFull message is sent from the requester node 110a to the home node 180. In this example, the WriteSharedCleanFull message includes a recommendation from the requester node as to whether the data should be stored by the home node 180 or not, and an address (addr) that indicates an identity of the data—specifically an address in memory where the data is stored. At a step 320, the home node issues a CompDBIDResp message to the requester node 110a. This message indicates that the data is desired by the home node 180 and that the requester node 110a is to transmit the data to the home node 180. The requester node 110a then responds in a step 330 with a CopyBackWRData message, which includes the requested data. When this is received by the home node 180, the data is stored in the system cache 170 of the home node 180.

Figure 3B:
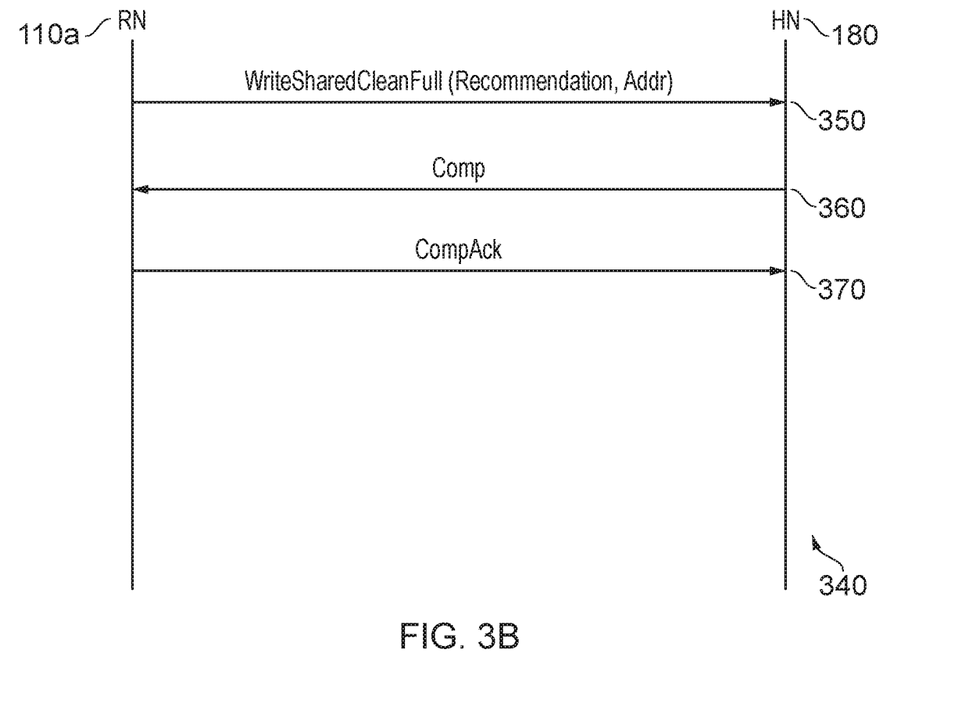

FIG. 3B illustrates an exchange of messages 340 when the home node 180 determines that the data is not to be stored. At the step 350, the requester node 110a issues the WriteSharedCleanFull message as previously discussed. In this situation, the home node 180 determines that the data is not desired. Consequently, in response to the offer, at step 360, the home node 180 issues a Comp message to the requester node 110a. This indicates that the requester node 110a is not to send the offered data. The requester node 110a then responds with a CompAck message at step 370 to indicate that the previous Comp message sent at step 360 has been received.

Note that in either of the above examples, the snoop filter 150 is updated as appropriate.

As previously noted, if the rejection rate (or non-acceptance rate) passes a threshold, then the requester node may, in some embodiments, stop offering data to the home node. This could be temporary or could be permanent. Such monitoring can take place by watching the reception of CompAck at the requester node.

Figure 4:
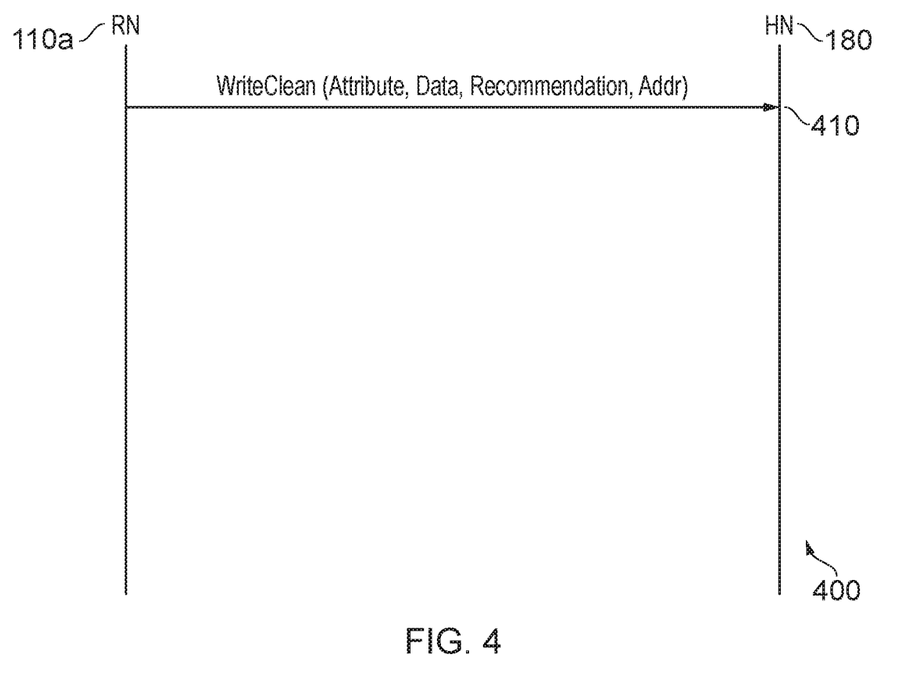
FIG. 4 illustrates an alternative process for offering the data in accordance with some embodiments.

FIG. 4 illustrates an alternative process for offering the data. In this example, the exchange of messages 400 contains a single message sent at a step 410 from the requester node 110*a* to the home node 180. This WriteClean message includes an attribute that indicates whether or not the message is being sent in respect of a non-forwardable transfer within the requester node 110*a*. In this case, it is assumed that the attribute indicates that this is so. The WriteClean message also includes the data itself, a recommendation as to whether the data should be stored by the home node 180, and an address that identifies the data in question. In this example, far fewer messages are exchanged between the requester node 110*a* and the home node 180. In particular, the home node 180 makes a determination as to whether the offered data should be stored. If the data is desired to be kept, then the home node 180 stores the data in the system cache 170. Otherwise, the WriteClean message is discarded.

In both of these examples, a recommendation is made by the requester node 110*a*. In other embodiments, the recommendation is not made. The recommendation could be based on a data usage pattern at the requester node 110*a*. For instance, if the data has been accessed a large number of times in a short space of time, then the recommendation may be for the data to be kept at the home node 180. In any event, the home node 180 is free to make its own decision. This decision may incorporate the recommendation made by the requester node 110*a*, or may be made based on or exclusively based on heuristics performed by the home node 180. Since the home node 180 has an overall view of the system, it may be in a better position to make a decision as to whether the data should be stored at the home node 180. There are a number of ways in which such heuristics may be arrived at. These are explored in the following figures.

Figure 5:
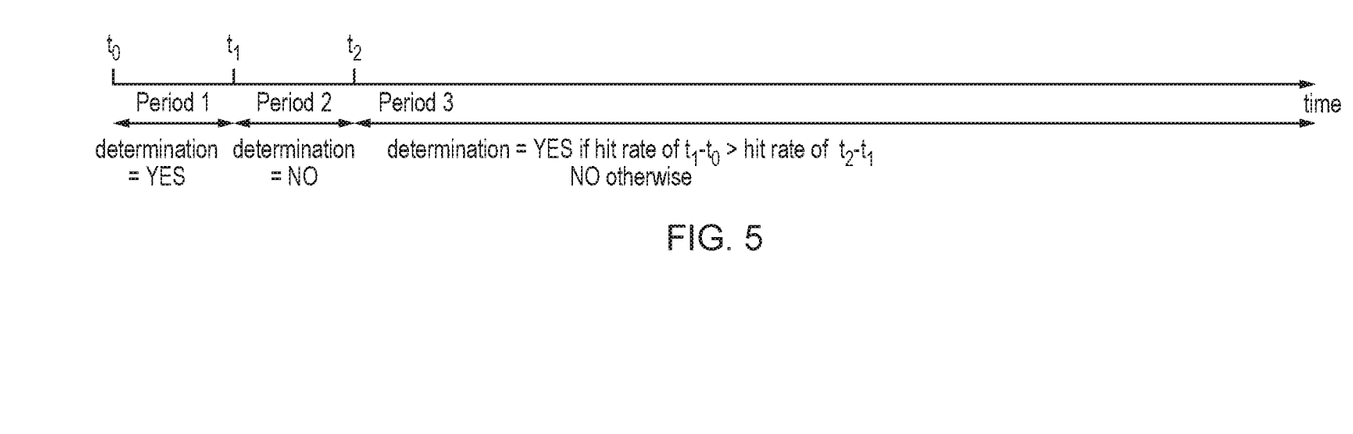
FIG. 5 illustrates a technique in which AB testing is used in order to determine where the data should be kept or not in accordance with some embodiments.

FIG. 5 illustrates a technique in which A/B testing is used in order to determine whether data from a master or group of masters should be kept or not. Within a first period of time from a time $t_0$ to a time $t_1$, offers of data from the master or group of masters are accepted. During this period, a hit rate of the system cache 170 is analysed by the performance analysis circuitry 175. During a second period of time from time $t_1$ to time td, any offers of data from the master or group of masters are rejected. Once again, the hit rate of the system cache 170 is monitored by the performance analysis circuitry 175. During a third period of time after time $t_2$ the determination is based on the two calculated hit rates. In particular, the determination is made to match whichever of the previous actions was found to yield the greater hit rate. In this instance, if the hit rate that occurred during the period between the time to to $t_1$ is greater than the hit rate between the time $t_1$ to $t_2$ then future offers of data from the master or masters are accepted. Otherwise, future offers of data from the master or masters are rejected.

It will be appreciated that the first period and the second period could be swapped. However, the third period of time occurs after the first period and the second period, which are used in order to provide the A/B testing. Furthermore, the entire testing process may be repeated after a sufficient period of time has elapsed. In this way it is possible to react to changes in the data of the system 100. Consequently, by testing the hit rate of the system cache 170 at the home node 180, it is possible to take action that is most likely to result in a larger hit rate being achieved for data offered by the master or group of masters.

Figure 6:
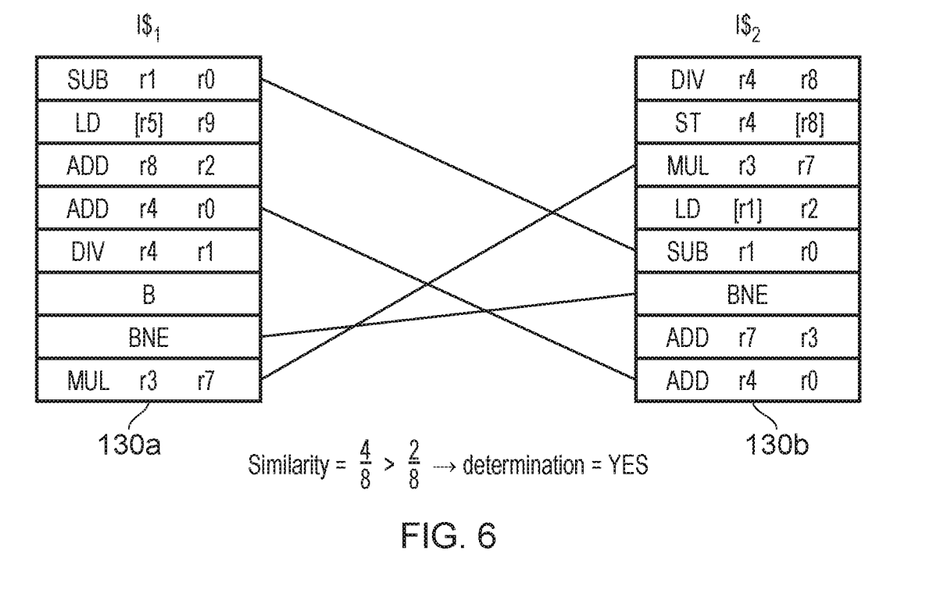
FIG. 6 illustrates the use of a heuristic that considers the similarity of instructions held within instruction caches of requester nodes in accordance with some embodiments.

FIG. 6 illustrates the use of a heuristic that considers the similarity of instructions held within instruction caches of requester nodes. In particular, a number of entries that are the same between the two instruction caches 130*a*, 130*b* are counted. This number is expressed as a proportion of the number of entries in each of the instruction caches 130*a*, 130*b*. If this proportion is larger than a threshold value (in this case 2/8), then the determination is that the offered data should be accepted.

This heuristic recognises that where the offered data corresponds with instructions, if there is significant instruction similarity between the instructions stored in the instruction caches 130*a*/130*b*, then it is likely that any data that is offered to the home node 180 is likely to be required as compared to a situation in which the CPUs 105*a*/105*b* execute completely different instructions. Consequently, if there is similarity between the processes between performed by the CPUs 105*a*/105*b*, then it may make sense to maintain as much data as possible and consequently the data is kept at the home node 180. In a case where more than two requester nodes exist, one may consider the maximum similarity between the instructions held at the offering requester node and any of the other requester nodes. It will be appreciated that other aggregations (such as minimum or average) can also be considered.

Figure 7:
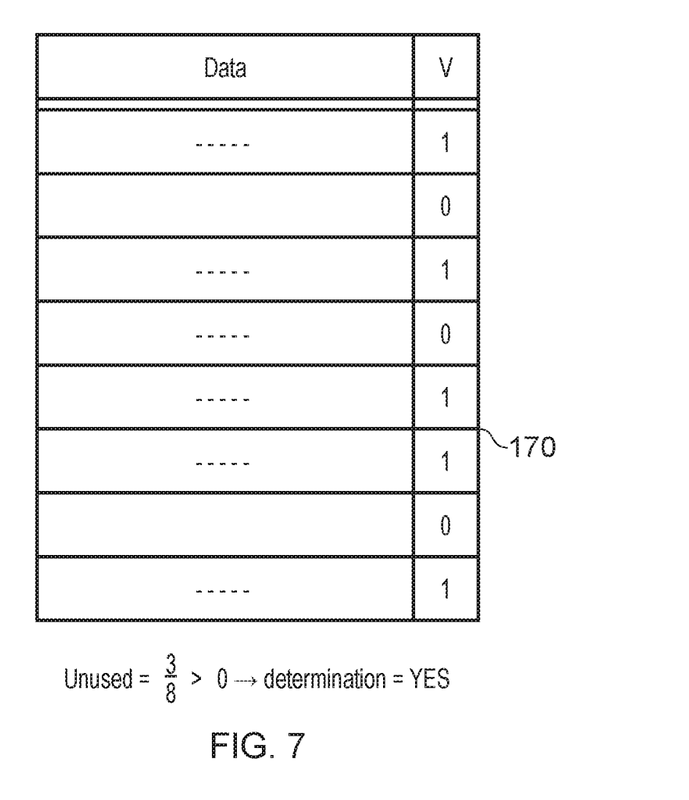
FIG. 7 illustrates a heuristic in which the number of unused entries in the system cache is considered in accordance with some embodiments.

FIG. 7 illustrates a heuristic in which the number of unused entries in the system cache 170 is considered. An unused entry may be considered to be one or both of: an entry of the system cache 170 that contains no data, and an entry of the system cache 170 that is marked as not valid (zero in the example of FIG. 7). If the number of unused entries exceeds some threshold value (zero in this example) then the data is stored at the system cache 170.

This heuristic recognises that where the system cache 170 has spare capacity, it makes sense to store data that is being offered that could be of use at a later time. In particular, any such offered data could be overwritten if more important data becomes available. Such a technique is particularly relevant where the system cache 170 is fully associative (e.g. it is possible to store any item of data at any location). Where the system cache 170 is set-associative, one might instead consider the unused capacity of each of the ways in which the offered data would be stored. For instance, if there are four locations where a given data item may be stored, and two of those locations are unused, then the unused capacity may be considered to be 2/4. This value can then be compared to the threshold in order to determine whether the offered data item should be stored in the system cache 170 or not.

Figure 8:
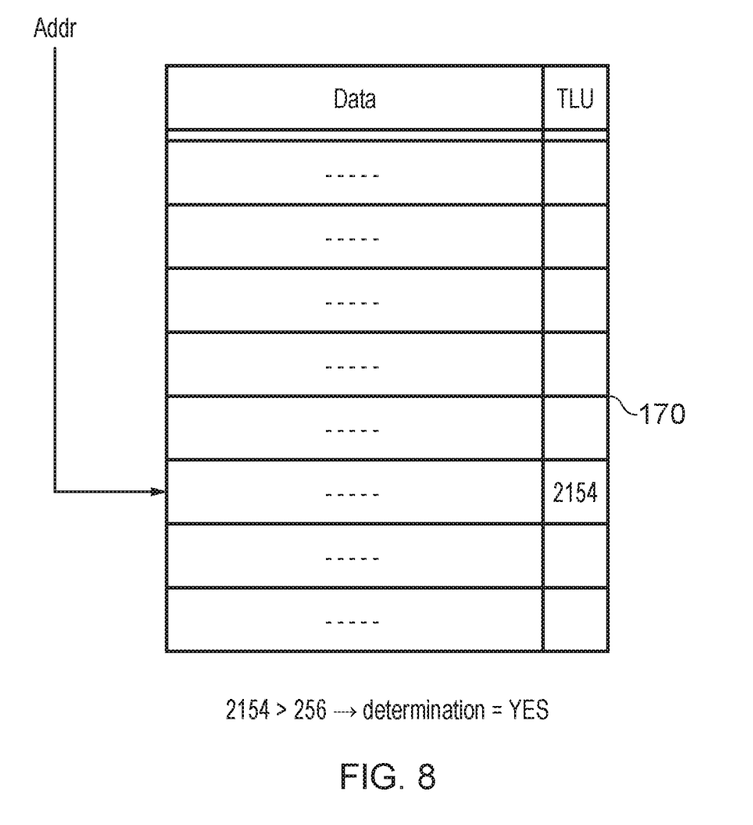
FIG. 8 illustrates a heuristic in which the Time-Last-Used (TLU) is considered in accordance with some embodiments.

FIG. 8 illustrates a heuristic in which the Time-Last-Used (TLU) is considered. In particular, in this example, the offered data value is analysed to determine a location in the system cache 170 at which it would be stored. The TLU of any entry stored at that location is then considered. If this value is above a threshold (e.g. 256) then the data is stored.

This heuristic recognises that it may be appropriate to consider whether the data that would be replaced in the system cache with the offered data is likely to be used or not. In particular, this heuristic recognises the technique of temporal-locality, in which data that was recently accessed is more likely to be accessed again as compared to data that was accessed less recently. Such a technique may be particularly appropriate where the system cache 170 is directly mapped (e.g. for a given data value, there is a specific location where that data value would be stored). However, the present technique may also be used for a set-associative system cache 170. In this situation, one may consider the greatest TLU or any way in which the offered data may be stored. This particular way may then be replaced with the offered data if its TLU is above the threshold value. Other aggregations may also be considered. In the case of a fully-associative system cache 170, one may consider the greatest TLU in the system cache 170. This entry may then be considered as the victim entry, which is replaced with the offered data if its TLU is above the threshold value. In each of these examples, if the TLU falls below the threshold value, then the data may not be stored.

It will be appreciated that this technique may be overridden where an empty entry exists. In particular, one may consider the TLU of an empty entry (including invalid entries) to be infinite.

Although these heuristics have been discussed separately, it will be appreciated that they could be used in any combination.

Figure 9:
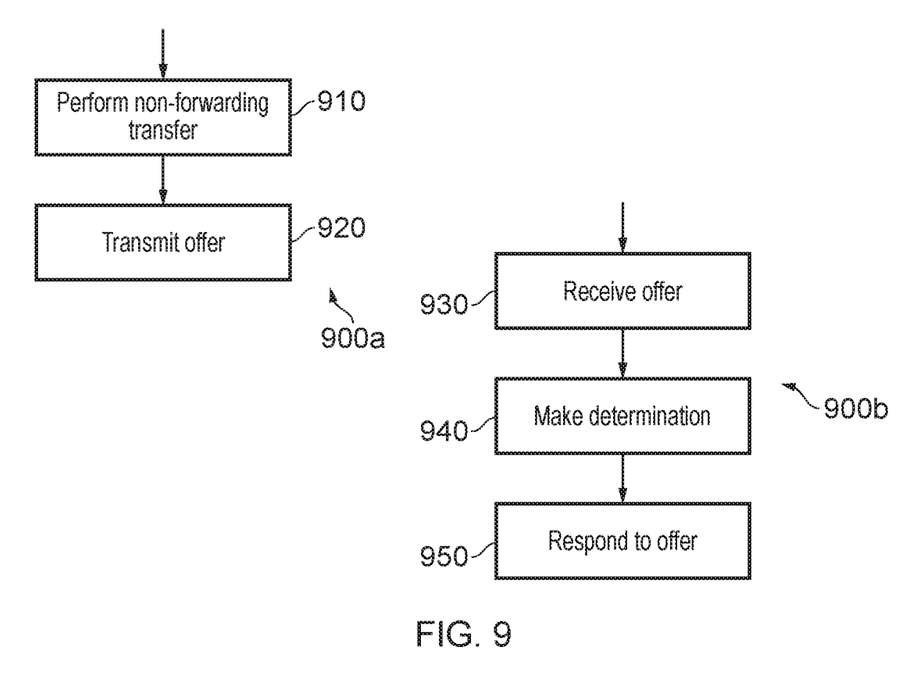
FIG. 9 illustrates methods that may be performed by the requester node and the home node in accordance with some embodiments.

FIG. 9 illustrates methods that may be performed by the requester node and the home node. In particular, a first flow chart 900a illustrates the method that may be performed by the requester node while a second flow chart 900b illustrates the method that may be performed with the home node. The overall process begins at step 910, where a non-forwardable transfer is performed by the requester node (e.g. from a data cache 115a to an instruction cache 130a via transfer circuitry 125a). At a step 920, an offer is transmitted from the requester node 110a to the home node 180. The offer indicates that a non-forwardable transfer of the data item is occurring, and therefore the data may soon no longer be accessible from the requester node 110a. At a step 930, the offer is received by the home node 180. At a step 940, the home node 180 uses processing circuitry 160 and one or more of the previously described heuristics in order to make a determination as to whether the offered data is to be stored in the system cache 170 of the home node 180. At a step 950, the offer is responded to as appropriate. Such a response may involve requesting the data be issued by the requesting node 110a to the home node, refusing the data from the requesting node 110 discarding the offer, or copying the data directly from the offer message into the system cache 170 if it is provided as part of the offer.

Accordingly, it is demonstrated how efficiency can be maintained in the face of a non-forwardable transfer that causes the data to no longer be accessible from the requester node 110a. The data can remain accessible by offering for it to be stored in the system cache 170 of a home node 180 (or an alternative location as directed by the home node). The decision of whether this data is to be stored or not is made by the home node 180 itself (possibly incorporating a recommendation made by the requester node 110a) and is thereby able to benefit from the overall system 100 view held by the home node 180.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus to be used with an interconnect comprising a home node, the apparatus comprising:
    a data cache;
    an instruction cache prohibited from forwarding to the home node;
    performance analysis circuitry to analyse a hit rate of the data cache, wherein
        during a first period of time, the determination is that the data item is to be stored;
        during a second period of time, distinct from the first period of time, the determination is that the data item is not to be stored; and
        during a third period of time after the first period of time and second period of time, the determination is based on the hit rate of the data cache during the first period of time compared to the hit rate of the data cache during the second period of time;
    transfer circuitry to perform a non-forwardable transfer of a data item from the data cache to the instruction cache; and
    transmit circuitry to transmit an offer to the home node, at a time of the nonforwardable transfer, to transfer the data item to the home node.

2. The apparatus according to claim 1, wherein
    the data cache is adapted to store clean data and dirty data; and
    the instruction cache is adapted to store clean data and is prohibited from storing dirty data.

3. The apparatus according to claim 2, wherein
    the data item is clean.

4. The apparatus according to claim 1, comprising:
    snoop response circuitry to respond to a snoop response by transmitting data stored in the data cache, wherein
    the snoop response circuitry is inhibited from responding to the snoop response by transmitting data stored in the instruction cache.

5. The apparatus according to claim 1, wherein
    the transmit circuitry is adapted to transfer the data item to the home node in response to receiving an acceptance of the offer.

6. The apparatus according to claim 5, comprising:
    receive circuitry to receive the acceptance of the offer.

7. The apparatus according to claim 1, wherein
    the offer comprises the data item.

8. The apparatus according to claim 1, comprising:
    a requester node, wherein
    the requester node comprises the data cache, the instruction cache, the transfer circuitry, and the transmit circuitry.

9. A method of transferring data in an interconnect comprising a requester node and a home node, the method comprising:
analysing a hit rate of a data cache, wherein
during a first period of time, the determination is that the data item is to be stored;
during a second period of time, distinct from the first period of time, the determination is that the data item is not to be stored; and
during a third period of time after the first period of time and second period of time, the determination is based on the hit rate of the data cache during the first period of time compared to the hit rate of the data cache during the second period of time;
performing a non-forwardable transfer of a data item from the data cache in the requester node to instruction cache in the requester node that is inhibited from forwarding to the home node; and
transmitting an offer to the home node, at a time of the non-forwardable transfer, to transfer the data item to the home node.

10. An apparatus to be used with an interconnect comprising a requester node, the apparatus comprising:
a data cache;
processing circuitry to perform a determination of whether a data item is to be stored in the data cache;
performance analysis circuitry to analyse a hit rate of the data cache, wherein
during a first period of time, the determination is that the data item is to be stored;
during a second period of time, distinct from the first period of time, the determination is that the data item is not to be stored; and
during a third period of time after the first period of time and second period of time, the determination is based on the hit rate of the data cache during the first period of time compared to the hit rate of the data cache during the second period of time; and
receive circuitry to receive an offer from the requester node, at a time of a nonforwardable transfer by the requester node of the data item to an instruction cache of the requester node, to transfer the data item to the apparatus prior to the data item being made non-forwardable, wherein
the processing circuitry is adapted to respond to the offer based on the determination.

11. The apparatus according to claim 10, comprising:
transmit circuitry to transmit a request for the data item, wherein
in response to the determination being that the data item is to be stored in the data cache, the processing circuitry is adapted to cause the transmit circuitry to transmit the request.

12. The apparatus according to claim 11, wherein
in response to the determination being that the data item is not to be stored in the data cache, the processing circuitry is adapted to not transmit the request.

13. The apparatus according to claim 10, wherein
the offer from the requester node comprises the data item;
in response to the determination being that the data item is to be stored in the data cache, the processing circuitry causes the data item to be stored in the data cache; and
in response to the determination being that the data item is not to be stored in the data cache, the processing circuitry causes the data item to be discarded.

14. The apparatus according to claim 10, wherein
the interconnect comprises a further requester node comprising a further instruction cache; and
the determination is based on a similarity between:
instructions in the instruction cache of the requester node, and
instructions in the further instruction cache of the further requester node.

15. The apparatus according to claim 10, wherein
the determination is based on an unused capacity of the data cache.

16. The apparatus according to claim 10, wherein
the determination is based on a time-last-used of an existing entry of the data cache at which the data item would be stored.

17. The apparatus according to claim 10, comprising:
a home node, wherein
the home node comprises the data cache, the processing circuitry, and the receive circuitry.

18. The apparatus according to claim 1, wherein
the transmit circuitry is adapted to inhibit transmitting the offer to the home node in response to a number of previous offers being declined by the home node.

19. A method of transferring data in an interconnect comprising a requester node and a home node, the method comprising:
receiving an offer from the requester node, at a time of a non-forwardable transfer by the requester node of a data item to an instruction cache of the requester node, to transfer the data item to the home node prior to the data item being made nonforwardable;
performing a determination, at the home node, of whether the data item is to be stored in the data cache of the home node;
wherein said determination comprises analysing a hit rate of a data cache, wherein
during a first period of time, the determination is that the data item is to be stored;
during a second period of time, distinct from the first period of time, the determination is that the data item is not to be stored; and
during a third period of time after the first period of time and second period of time, the determination is based on the hit rate of the data cache during the first period of time compared to the hit rate of the data cache during the second period of time; and
responding to the offer based on the determination.

* * * * *